(12) United States Patent
Pook et al.

(10) Patent No.: US 8,628,717 B2
(45) Date of Patent: Jan. 14, 2014

(54) COMPOSITE STRUCTURES HAVING INTEGRATED STIFFENERS AND METHOD OF MAKING THE SAME

(75) Inventors: David A. Pook, Malvern East (AU); Peter J. Lockett, Fairfield (AU); Andrew Glynn, North Melbourne (AU)

(73) Assignee: The Boeing Company, Chicago, IL (US)

( * ) Notice: Subject to any disclaimer, the term of this patent is extended or adjusted under 35 U.S.C. 154(b) by 429 days.

(21) Appl. No.: 12/823,414

(22) Filed: Jun. 25, 2010

(65) Prior Publication Data

US 2011/0315824 A1 Dec. 29, 2011

(51) Int. Cl.
*B29C 51/10* (2006.01)

(52) U.S. Cl.
USPC .................. 264/511; 264/510; 264/571

(58) Field of Classification Search
None
See application file for complete search history.

(56) References Cited

U.S. PATENT DOCUMENTS

| | | | |
|---|---|---|---|
| 2,709,973 A | 6/1955 | Meyer et al. | |
| 3,339,333 A | 9/1967 | Kovalcik | |
| 3,775,238 A | 11/1973 | Lyman | |
| 3,890,749 A | 6/1975 | Gunther | |
| 4,357,292 A | 11/1982 | Myers | |
| 4,606,961 A | 8/1986 | Munsen | |
| 4,942,013 A * | 7/1990 | Palmer et al. | 264/511 |
| 5,419,965 A | 5/1995 | Hampson | |
| 5,567,499 A | 10/1996 | Cundiff | |
| 5,569,508 A | 10/1996 | Cundiff | |
| 5,601,852 A | 2/1997 | Seemann | |
| 5,771,680 A | 6/1998 | Zahedi | |
| 5,851,336 A | 12/1998 | Cundiff | |
| 6,156,146 A | 12/2000 | Cundiff | |
| 6,319,447 B1 | 11/2001 | Cundiff | |
| 6,415,496 B1 | 7/2002 | Dominguez Casado et al. | |
| 6,561,478 B2 | 5/2003 | Cundiff | |
| 6,586,054 B2 | 7/2003 | Walsh | |
| 6,589,618 B2 | 7/2003 | Cundiff | |
| 6,627,142 B2 | 9/2003 | Slaughter et al. | |
| 6,811,733 B2 | 11/2004 | Nelson | |
| 6,840,750 B2 | 1/2005 | Thrash | |
| 6,872,340 B2 | 3/2005 | Cundiff | |
| 6,896,841 B2 | 5/2005 | Velicki et al. | |
| 7,074,474 B2 | 7/2006 | Toi et al. | |
| 7,080,805 B2 | 7/2006 | Prichard | |

(Continued)

FOREIGN PATENT DOCUMENTS

| | | | |
|---|---|---|---|
| EP | 2452808 A1 | 5/2012 | |
| NL | 1001725 C2 | 5/1997 | |

(Continued)

OTHER PUBLICATIONS

Byrd, L. W. and V. Birman (2005). "The estimate of z-pins on the strain release rate, fracture and fatigue in a composite co-cured z-pinned double cantilever beam." Composite Structures 68(1): 53-63. http://www.sciencedirect.com/science/article/B6TWP-4C47G3S-1/2/35c4fbe50b301f6d99a3f7cOce08fcb2.

(Continued)

*Primary Examiner* — Monica Huson
(74) *Attorney, Agent, or Firm* — Yee & Associates, P.C.

(57) ABSTRACT

A composite structure is made by placing a stiffener preform and a composite structure reinforcement on a tool. The preform and the reinforcement are vacuum bagged processed and co-infused with a thermoset resin to form a stiffened, unitized structure.

11 Claims, 8 Drawing Sheets

(56) References Cited

U.S. PATENT DOCUMENTS

| | | | |
|---|---|---|---|
| 7,138,028 | B2 | 11/2006 | Burpo |
| 7,334,782 | B2 | 2/2008 | Woods |
| 7,413,695 | B2 | 8/2008 | Thrash |
| 7,419,627 | B2 | 9/2008 | Sheu |
| 7,510,757 | B2 | 3/2009 | Lee |
| 7,633,040 | B2 | 12/2009 | Glain et al. |
| 7,682,682 | B2 | 3/2010 | Leon-Dufour et al. |
| 8,042,315 | B2 | 10/2011 | Ashton et al. |
| 8,042,767 | B2 | 10/2011 | Velicki et al. |
| 8,043,453 | B2 | 10/2011 | Sawicki et al. |
| 8,091,603 | B2 | 1/2012 | Pham et al. |
| 8,182,628 | B2 | 5/2012 | Biornstad et al. |
| 8,267,354 | B2 | 9/2012 | Kallinen et al. |
| 8,302,909 | B2 | 11/2012 | Cazeneuve et al. |
| 8,424,806 | B2 | 4/2013 | Outon Hernandez et al. |
| 2003/0025231 | A1 | 2/2003 | Slaughter et al. |
| 2005/0003145 | A1 | 1/2005 | Toi |
| 2005/0073076 | A1 | 4/2005 | Woods et al. |
| 2005/0211846 | A1 | 9/2005 | Leon-Dufour et al. |
| 2007/0108665 | A1 | 5/2007 | Glain et al. |
| 2008/0246175 | A1* | 10/2008 | Biornstad et al. .......... 264/109 |
| 2009/0044914 | A1 | 2/2009 | Pham et al. |
| 2009/0057487 | A1 | 3/2009 | Velicki et al. |
| 2009/0200425 | A1 | 8/2009 | Kallinen et al. |
| 2010/0024958 | A1 | 2/2010 | Sawicki et al. |
| 2010/0170989 | A1 | 7/2010 | Gray |
| 2012/0052247 | A1 | 3/2012 | Pook et al. |
| 2012/0119422 | A1 | 5/2012 | Lockett et al. |
| 2012/0234978 | A1 | 9/2012 | Hernando Navas et al. |

FOREIGN PATENT DOCUMENTS

| | | | |
|---|---|---|---|
| WO | 2004011169 | A2 | 2/2004 |
| WO | 2006096647 | A2 | 9/2006 |
| WO | 2011003844 | A1 | 1/2011 |
| WO | PCT/US2011/036191 | | 5/2011 |
| WO | 2011162884 | A2 | 12/2011 |

OTHER PUBLICATIONS

Byrd, L. W. and V. Birman (2005). "The estimate of the effect of z-pins on the strain release rate, fracture and fatigue in a composite co-cured z-pinned double cantilever beam." Composite Structures 68(1): 53-63. http://www.sciencedirect.com/science/article/B6TWP-4C47G3S-1/2/35c4fbe50b301f6d99a3f7c0ce08fcb2.

Christopher T. Key, M. R. G. and C. H. Andrew (2003). "Progressive failure predictions for rib-stiffened panels based on multicontinuum technology," Composite Structures 65(3-4): 357-366. http://www.sciencedirect.com/science/article/B6TWP-4B9D7Y5-3/2/2bbf1f5da96969f8280494eecd40aeff.

John Higgins, P. E., P. Wegner, et al. (2004). "Design and testing of the Minotaur advanced grid-stiffened fairing." Composite Structures 66(1-4): 339-349. http://www.sciencedirect.com/science/article/B6TWP-4DS7YDD-2/2/3b11916f1da3d12111c360b4475efd51.

Mouritz, A. P. (2007). "Review of z-pinned composite laminates." Composites Part A: Applied Science and Manufacturing 38(12): 2383-2397. http://www.sciencedirect.com/science/article/B6TWN-4PGPVXR-3/2/73e14a395d8e71e67fe887869b23b3f0.

Sheppard, A. T., K. H. Leong, et al. (1998). "Rib separation in postbuckling stiffened shear panels." Composite Structures 41(3-4): 339-352. http://www.sciencedirect.com/science/article/B6TWP-3VNH1XY-F/2/a1f194e9b1e7523d356256424942f8c8.

Stickler, P. B. and M. Ramulu (2001). "Investigation of mechanical behavior of transverse stitched T-joints with PR520 resin in flexure and tension." Composite Structures 52(3-4): 307-314. http://www.sciencedirect.com/science/article/B6TWP-42YDNJC-6/2/f8c0dde9fd5517d78de019418dc73fa1.

Office Action, dated Aug. 16, 2012, regarding USPTO U.S. Appl. No. 12/944,089, 26 pages.

International Search Report, dated Sep. 26, 2011, regarding Application No. PCT/US2011/036191 (WO2011162884), 3 pages.

European Search Report, dated Feb. 16, 2012, regarding Application No. EP11187924 (EP2452808), 8 pages.

International Search Report, dated May 3, 2012, regarding Application No. PCT/US2011/063658, 12 pages.

Byrd et al., "The estimate of the effect of z-pins on the strain release rate, fracture, and fatigue in a composite co-cured z-pinned double cantilever beam," Composites Structures, 2005, vol. 68, No. 1, pp. 53-63. (Abstract).

Campbell, "Cure Tooling," In: Manufacturing Processes for Advanced Composites, 2004. Elsevier Ltd., Oxford, pp. 128-129.

Han et al., "Resin film infusion of stitched stiffened composite panels," Composites Part A: Applied Science and Manufacturing, 2003, vol. 34, pp. 227-236.

Higgins et al., "Design and testing of the Minotaur advanced grid-stiffened fairing," Composite Structures, 2004, vol. 66, No. 1-4, pp. 339-349.

Key et al., "Progressive failure predictions for rib-stiffened panels based on multicontinuum technology," Composite Structures, 2004, vol. 65, No. 3-4, pp. 357-366. (Abstract).

Mourtiz, "Review of z-pinned composite laminates," Composites Part A: Applied Science and Manufacturing, 2007, vol. 38, No. 12, pp. 2383-2397. (Abstract).

Sheppard et al., "Rib separation in postbuckling stiffened shear panels," Composite Structures, 1998, vol. 41, No. 3-4, pp. 339-352. (Abstract).

Stickler et al., "Investigation of mechanical behavior of transverse stitched T-joints with PR520 resin in flexure and tension," Composite Structures, 2001, vol. 52, No. 3-4, pp. 307-314. (Abstract).

Final Office Action, dated Dec. 21, 2012, regarding USPTO U.S. Appl. No. 12/944,089, 24 pages.

Byrd et al., "The estimate of the effect of z-pins on the strain release rate, fracture, and fatigue in a composite co-cured z-pinned double cantilever beam," Composites Structures, 2005, vol. 68, No. 1, pp. 53-63.

Key et al., "Progressive failure predictions for rib-stiffened panels based on multicontinuum technology," Composite Structures, 2004, vol. 65, No. 3-4, pp. 357-366.

Mouritz, "Review of z-pinned composite laminates," Composites Part A: Applied Science and Manufacturing, 2007, vol. 38, No. 12, pp. 2383-2397.

Sheppard et al., "Rib separation in postbuckling stiffened shear panels," Composite Structures, 1998, vol. 41, No. 3-4, pp. 339-352.

Stickler et al., "Investigation of mechanical behavior of transverse stitched T-joints with PR520 resin in flexure and tenstion," Composite Structures, 2001, vol. 52, No. 3-4, pp. 307-314.

Locket et al., "Method of Manufacturing Resin Infused Composite Parts Using a Perforated Caul Sheet", USPTO U.S. Appl. No. 13/905,630, filed May 30, 2013, 33 pages.

Final Office Action, dated May 6, 2013, regarding USPTO U.S. Appl. No. 13/012,162, 28 pages.

EP examination communication dated May 6, 2013 regarding application 11187924.3-1706, reference NAM/P119089EP00, applicant The Boeing Company, 5 pages.

International Preliminary Report on Patentability, dated Jul. 30, 2013, regarding Application No. PCT/US2011/063658, 7 pages.

* cited by examiner

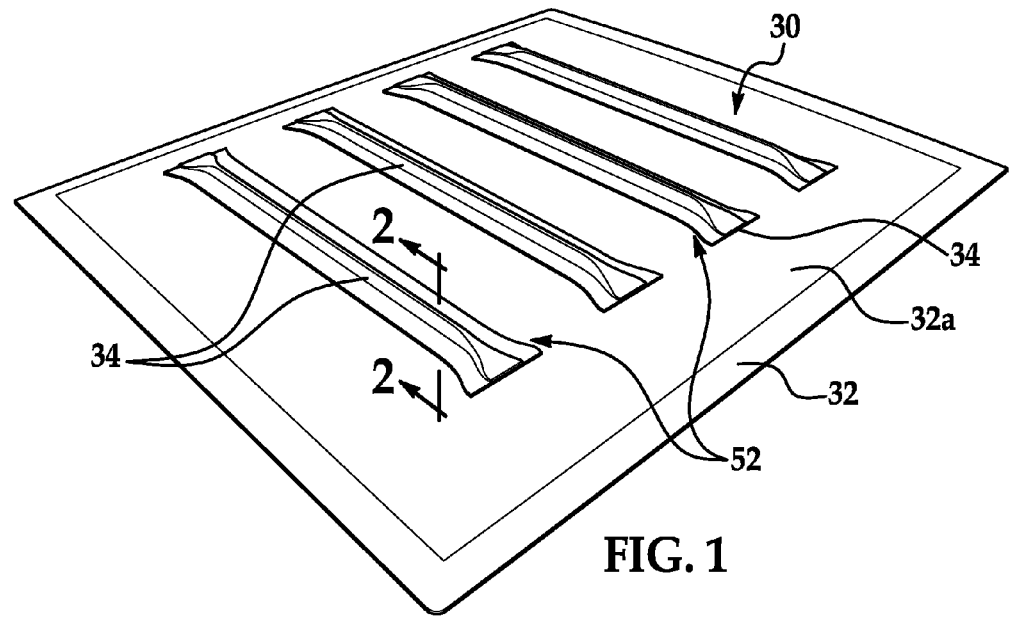
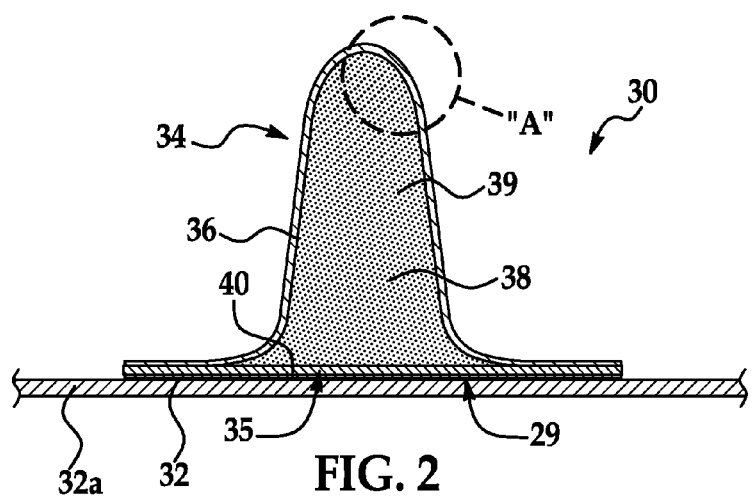
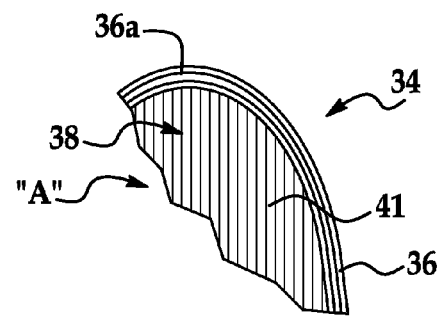

COMPOSITE STRUCTURES HAVING INTEGRATED STIFFENERS AND METHOD OF MAKING THE SAME

TECHNICAL FIELD

This disclosure generally relates to composite structures, and deals more particularly with composite structural members having integrated stiffeners, and to methods for making such members.

BACKGROUND

It is sometimes necessary to reinforce composite structures, such as those used in aerospace industry in order to meet strength and/or stiffness requirements. These structures may be reinforced by adding stiffeners to the structure which may provide the structure with additional strength and rigidity. In the past, individual stiffeners have been attached to primary structural members using any of several secondary assembly processes, including but not limited to the use of discrete fasteners, bonding, co-bonding and co-curing. Each of these processes may have disadvantages, such as, without limitation, the additional time and labor to complete the assembly process and/or the need for relatively expensive capital equipment such as autoclaves used to co-cure parts. Additionally, in some cases, the stiffeners may comprise multiple parts which may add undesirable weight and/or part count to a vehicle and/or increase the time and labor required to complete the assembly process.

Accordingly, there is a need for a simple, cost effective method of making stiffened composite structures in which stiffeners are integrated into structural members to form a unitized structure. There is also a need for a method of making stiffened composite structures that reduces the need for costly capital equipment and which may be at least partially automated for use in higher production environments.

SUMMARY

According to the disclosed embodiments, stiffened composite structures may be manufactured using modular stiffeners capable of being shaped, curved or patterned to any of various three dimensional profiles. The stiffeners may be integrated into any of various composite structural members, such as a skin, a panel, a web, or a flange, to name only a few. The stiffeners may be interconnected to form a stiffener network that is integrated into a composite member. In some embodiments, stiffened composite structures may incorporate stiffener features for controlling crack propagation and arrestment, and for strengthening areas in a member surrounding a cutout in the member. The modular stiffeners may be integrated into composite members during the manufacturing process by co-infusing separate fiber reinforcements and preforms during a vacuum-assisted resin infusion process. Co-infusion of the reinforcement and preforms, and subsequent curing results in a unitized composite structure in which the modular stiffeners are integrally formed within the structural members.

The manufacturing process employs simplified tooling and may avoid the need for relatively expensive capital equipment. The modular design of the stiffeners may render them cost effective in many applications and may provide flexibility in stiffener shaping and layout. For example, truss configurations and grid layouts of the stiffeners may be employed, in contrast to conventional stiffener layout design which may be limited to parallel and/or tapered, unconnected straight stiffeners. The modular nature of the stiffeners also may allow the use of a greater number of smaller stiffeners in a structure which may provide performance advantages over prior stiffened structures which may use a fewer number of larger stiffeners. Use of the disclosed stiffeners in composite structures may facilitate easier nondestructive inspection of the structure from a single side of the structure compared with prior stiffening arrangements which may require inspection from multiple sides of the structure.

According to one disclosed embodiment, an integrally stiffened composite structure is provided. The structure comprises a structural member portion, a stiffener portion and a cured polymer resin matrix. The structural member portion including a first fiber reinforcement held in the matrix. The stiffener portion includes a second fiber reinforcement held in the matrix for stiffening the structural member portion. The stiffener portion includes an outer shell and an inner core. The structural member portion may be one of a panel, a skin, a beam, a flange, a web or a channel. The structural and stiffener portions may have substantially matching curvatures. The stiffener portion may be arranged in a connected or unconnected layout.

According to another embodiment, a method is provided of making a unitized, stiffened composite structure. The method comprises forming at least one recess in a face of a mold tool generally matching the size and location of a stiffener for stiffening the structure, and placing a fiber perform in the recess. The method further includes placing a structural member fiber reinforcement on the mold tool overlying the fiber perform, and co-infusing them on the mold tool with a thermoset resin. The resin-infused reinforcement and the preform are then cured.

According to still another embodiment, a method is provided of making a stiffened composite panel. The method comprises recessing a plurality of stiffener fiber preforms in the face of a tool, and placing a panel fiber reinforcement on the tool face overlying and in contact with the recessed stiffener preform. The panel reinforcement and the preform are vacuum bagged on the tool and co-infused with a thermoset resin.

According to another disclosed embodiment, a method is provided of making a stiffened composite panel. The method comprises recessing a plurality of fiber reinforcement stiffener preforms in the face of a mold tool and placing a fiber panel reinforcement on the tool face overlying and in contact with the recessed stiffener preforms. The reinforcement and the preform are vacuum bagged on the tool and a vacuum is drawn in the bag. The reinforcement and the preform are co-infused with a thermoset resin, and then cured.

According to still another embodiment, apparatus is provided for making a composite structure having one or more integral stiffeners. The apparatus comprises a tool having a tool face on which a fiber reinforcement may be placed, and at least one groove in the tool face for receiving and recessing a fiber perform relative to the fiber reinforcement.

BRIEF DESCRIPTION OF THE ILLUSTRATIONS

FIG. 1 is an illustration of a perspective view of a unitized composite panel having integrally formed stiffeners.

FIG. 2 is an illustration of a cross sectional view taken along the line 2-2 in FIG. 1.

FIG. 3 is an illustration of a sectional view of a corner of an alternate form of the stiffener corresponding to the portion designated as "A" in FIG. 2.

DETAILED DESCRIPTION

Figure 4:
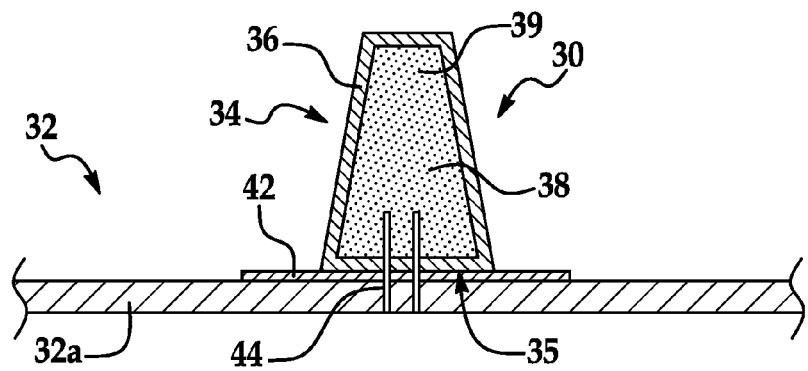
FIGS. 4-9 are illustrations of sectional views respectively showing alternate forms of the stiffener.

Referring first to FIG. 1, a unitized composite structure 30 comprises a structural member 32 having a plurality of integrally formed stiffeners 34 which may provide the structural member 32 with additional strength and rigidity. In the illustrated example, the structural member 32 is a substantially flat panel 32a, and the stiffeners 34 are arranged to extend substantially parallel to each other on one side of the panel 32a. Stiffener run-outs 52, also sometimes referred to herein as flanges 52, are blended substantially smoothly with the panel 32a in order to reduce peak stress concentrations in the panel 32a. As will be discussed later, the structural member 32 may have other shapes and geometries, depending on the application, including but not limited to channels, beams, webs, flanges, skins and the like.

Referring now to FIG. 2, each of the stiffeners 30 is modular in design and comprises an inner core 38 surrounded by an outer shell 36 having a bottom cap 35 joined to the panel 32a along a butt joint 29. An optional layer of adhesive 40 may be used to assist in joining the stiffener 34 to the panel 32a at the butt joint 29. As will be discussed later in more detail, the shell 36 may comprise one or more layers (not shown in FIG. 2) of a resin infused composite member fiber reinforcement 67 (FIG. 10) that may be braided, knitted or woven as a fabric. The reinforcing fibers may comprise carbon, glass or a variety of polymers or other suitable reinforcements. In this example, the shell 36 is continuous and includes a radiused top 43 and sidewalls 45 that are integrally connected through radius sections 47 with laterally extending flanges 52. The flanges 52 overlie the bottom cap 35 and increase the area of the butt joint 29 between the stiffener 34 and the panel 32a, while also providing a smooth transition between the shell 36 and the panel 32a that assists in minimizing peak stress concentrations on the panel 32a, as mentioned previously.

The inner core 38 may be hollow or may be partially or completely filled with a structural or non-structural material, depending upon the application. In the case of the example shown in FIG. 2, the inner core 38 is filled with a suitable uni-directional carbon fiber reinforcement 39. FIG. 3 illustrates an alternate embodiment of the modular stiffener 34 wherein the shell 36 comprises multiple layers 36a of braided fibers held in a resin matrix, and the core 38 is filled with one or more plies 41 of fiber reinforced resin which may be in the form of unidirectional tape, tows or a fabric.

As mentioned above, the stiffener 34 may have numerous variations in geometry and/or construction details. FIG. 4 illustrates a stiffener 34 similar to that shown in FIG. 2, but wherein through thickness reinforcements, such as but not limited to Z-Pins, 44 are used to aid in joining the stiffener 34 to the panel 32a and to provide additional reinforcement of the structure 32. The Z-pins 44 extend through the panel 32a and bottom cap 35 of the stiffener 34 into the core 38. The stiffener 34 shown in FIG. 4 is generally trapezoidal in cross section however, other cross sectional shapes may be possible, including but not limited to a "T", a "J", a "C", an "I", a "Z" or a hat. In other embodiments, the stiffener 34 may comprise a solid laminate (not shown), or a core with solid laminate facesheets (not shown).

Figure 5:
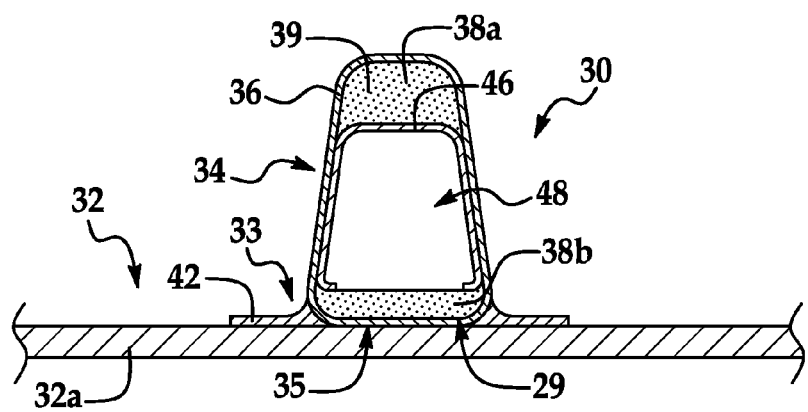

FIG. 5 illustrates another variation of the stiffener 34 which includes an inner shell 46 that divides the core 38 into a hollow core section 48 separating two core sections 38a. 38b that may or may not be filled with structural reinforcement 39 or other filler. In this example, the end cap 35 is joined directly to the panel 32a along a butt joint 29, and adhesive 42 is used along the outer margins 33 of the butt joint 29.

Figure 6:
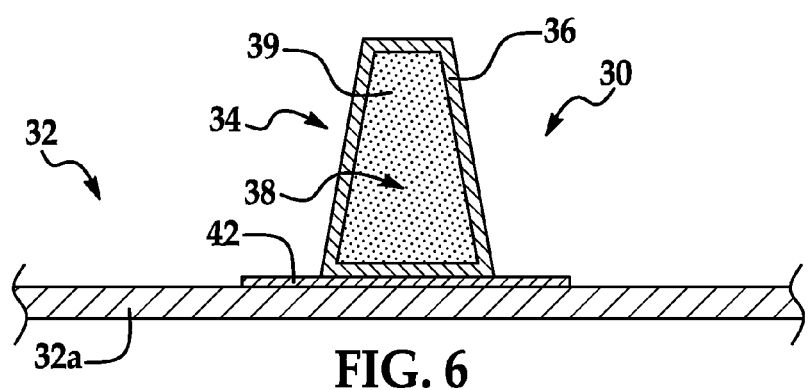

FIG. 6 illustrates another version of the stiffener 34, similar to that shown in FIG. 2, but wherein the core 38 is hollow.

Figure 7:
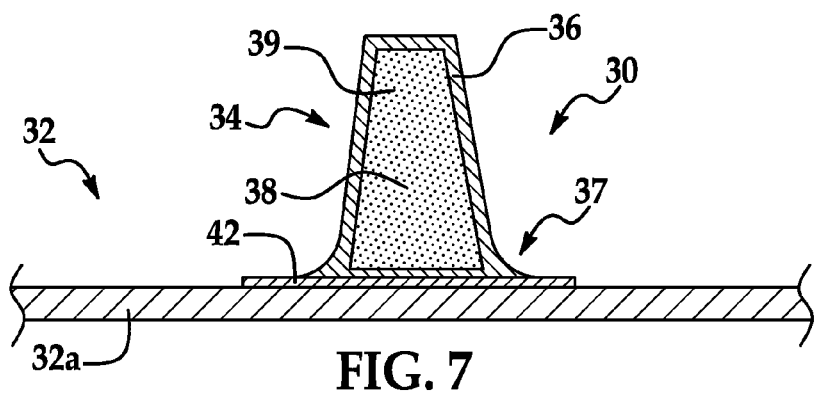

Still another variation of the stiffener 34 is shown in FIG. 7 having an inner core 38 filled with reinforcement 39 and lower side wall edges 37 that are radiused.

Figure 8:
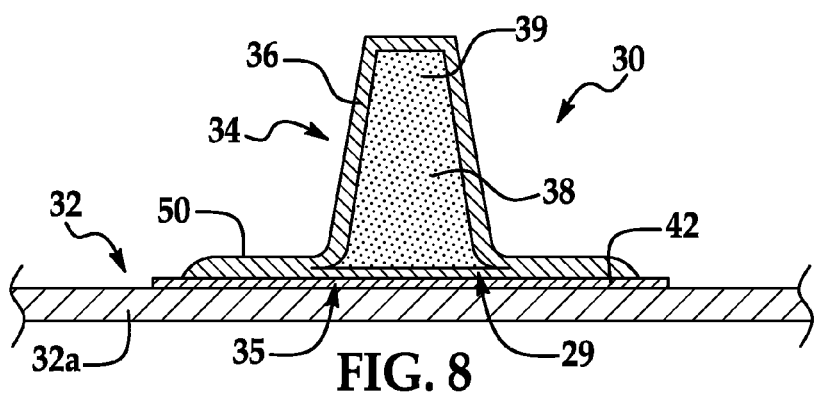

FIG. 8 illustrates another embodiment of the stiffener 34 wherein the base cap 35 and the outer shell 36 have overlapping, laterally extending flanges 52 which increase the area of the butt joint 29 between the panel 32a and the stiffener 34 and assist in minimizing peak stress concentrations on the panel 32a.

Figure 9:
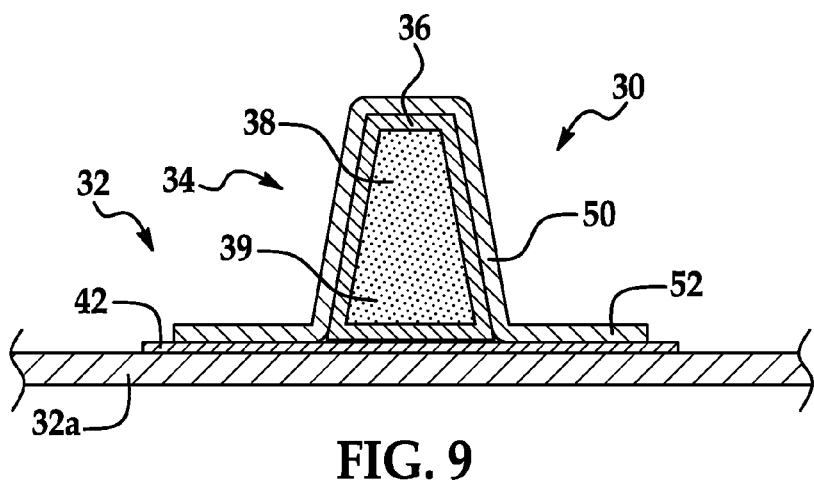

Still another example of the stiffener 34 is shown in FIG. 9. This embodiment of the stiffener 34 is similar to the embodiment shown in FIG. 2 except that one or more additional plies 50 are wrapped over the outer shell 36 and extend laterally to form flanges 52. The ply wraps 50 both strengthen the stiffener 34 and increase the area of contact between the panel 32a and the shell 38/flanges 52, while the flanges 52 form stiffener runouts 52 that assist in minimizing peak stress concentrations on the panel 32a.

From FIGS. 2-9, it may be appreciated that the stiffener 34 may have a wide range of geometries, features, core fillers and reinforcements which may add strength and/or stiffness to the stiffener 34 and/or increase the strength and/or damage tolerance of the joint 29 between the stiffener 34 and the panel 32a. It may also be appreciated from the forgoing description, that the stiffened composite structure 30 comprises a substantially continuous and homogeneous polymer resin matrix that functions to holds both a structural member portion 32 and a stiffener portion 34. The structure 30 is unitized by virtue of the structural member and stiffener portions 30, 32 respectively being integrated by the matrix material.

Figure 10:
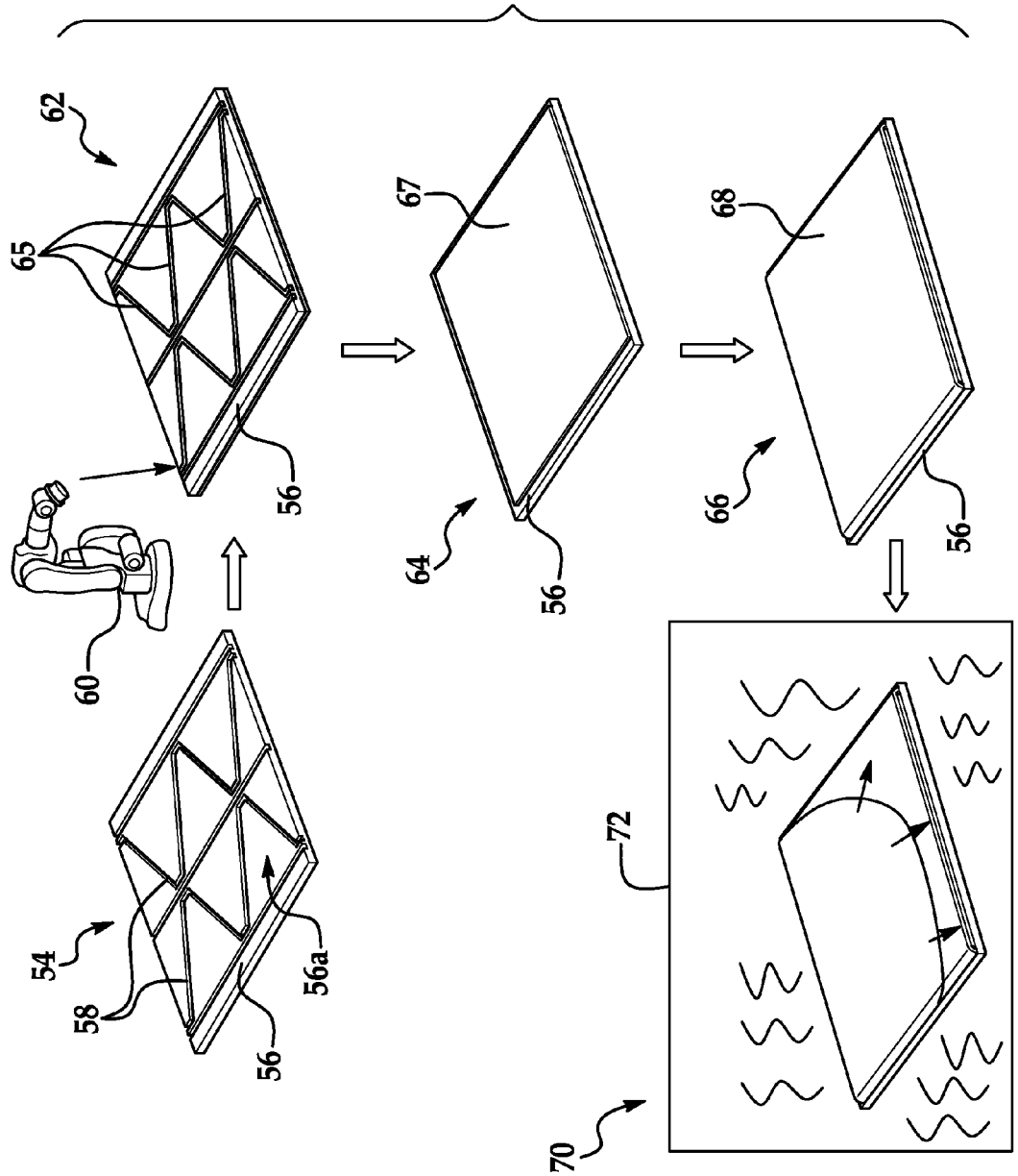
FIG. 10 is an illustration showing the assembly process used in making the stiffened composite structure according to the disclosed method.

Attention is now directed to FIG. 10 which illustrates several basic steps of a method of making a unitized composite structure 30 having one or more integrally formed stiffeners 34 (FIG. 1). As shown at 54, a single-piece, simple tool 56 has a tool face 56a that defines the inner mold line (IML) of the finished composite structure 30. The tool face 56a may be substantially flat, as shown in FIG. 10, or may have one or more curves or features matching the IML of the finished structure 30. One or more grooves 58 are formed in the tool face 56*a* that correspond to the geometry of the stiffeners 34 that are to be integrated into the finished structure 30. The depth D of the grooves 58 substantially correspond to the height H of the stiffeners 34 (see FIG. 11). The tool face 56*a* may also include additional, cavity-like grooves (not shown) into which nodal connectors (not shown) may be placed in order to form network-like interconnections between the stiffeners 34, as will be discussed below in more detail.

As shown at 62, dry, or substantially dry fiber stiffener preforms 65 are placed in the grooves 58 either manually, or using an automated placement equipment 60. Depending on the shape and construction of the stiffener preforms 65, portions of the stiffener preforms 65 may be tacked together with tackifiers or binders to assist in holding the preform 65 together or to maintain their shapes until they are infused with resin. Prior to being infused with resin and cured, the stiffener preforms 65 may be cord-like and continuous in length, allowing them to be stored in roll form, dispensed and cut to length as needed. Alternatively, the preforms 65 may be stiff and formed substantially to the required length, size and shape and stored flat, or any variation between continuous/flexible and discrete/stiff. When automated placement equipment 60 is used, the preforms 65 may be placed on the tool 56 at relatively high rates. Because the grooves 58 in the tool 56 are pre-aligned, the location and orientation of the stiffeners 34 relative to the composite member 32 can be precisely controlled. In other words, the fixed position of the grooves 58 in the tool face 56*a* automatically indexes the preforms 65 relative to each other, and relative to the fiber reinforcement 67. The preforms 65 are substantially identical to the stiffeners 34 previously described except that they have not yet been infused with a resin and are therefore relatively flexible.

The grooves 58 may have a cross sectional profile (not shown) that substantially matches that of the preforms 65, so that when placed in the grooves 58, the preforms 65 substantially completely fill the grooves 58, resulting in a substantially smooth IML profile. Flexible preforms 65 readily conform to the cross sectional profile and curvature (if any) of the grooves 58. Discrete/stiff preforms may be pre-formed to at least substantially match the cross sectional profile and curvature (if any) of the grooves. The grooves 58 essentially recess the stiffener preforms 65 in the tool 56 relative to a fiber reinforcement 67 so that the top of the preforms 65 lie generally flush with the tool face 56*a*. Optionally, a film adhesive (not shown) may be placed in the grooves 58, overlying the stiffener preforms 65, in those applications where it is desired to adhesively bond the stiffener caps 35 to the composite member 32 along the butt joint 29, as shown in FIG. 2.

Next, as shown at 64, the dry or substantially dry composite member fiber reinforcement 67 is placed on the tool face 56*a*, overlying and contacting the stiffener preforms 65 and the tool face 56*a*. The composite member fiber reinforcement 67 as well as the fiber performs 65 may be tackified with a binder (not shown). The composite member fiber reinforcement 67 may comprise, for example and without limitation, a preform that may include multiple plies of woven or knitted fabric that are laid up ply-by-ply on the tool face 56*a*, or which are stacked and then placed as a single pre-assembled lay-up on the tool face 56*a*. In the illustrated example, the composite member fiber reinforcement 67 is substantially flat however, in other embodiments, it is possible that the composite member fiber reinforcement 67 may be a preform that is shaped before the composite member fiber reinforcement 67 is placed on the tool face 56*a*. At 66, a caul sheet 68 is placed over the composite member fiber member reinforcement 67. The caul sheet 68 aids in controlling the OML (outer mold line) surface finish and skin mark-off adjacent the stiffener 34. Then, at 70, preform 65 and composite member fiber reinforcement 67 are co-infused with a suitable thermoset resin using any of various well known resin infusion techniques, including, for example and without limitation, vacuum assisted resin infusion molding (VARIM). As will be discussed below, the preform 65 and fiber reinforcement 67 may be compacted and consolidated prior to resin infusion. The infused preform 65 and composite member fiber reinforcement 67 are then cured by the application of heat though any suitable means such as an oven 72.

Figure 11:
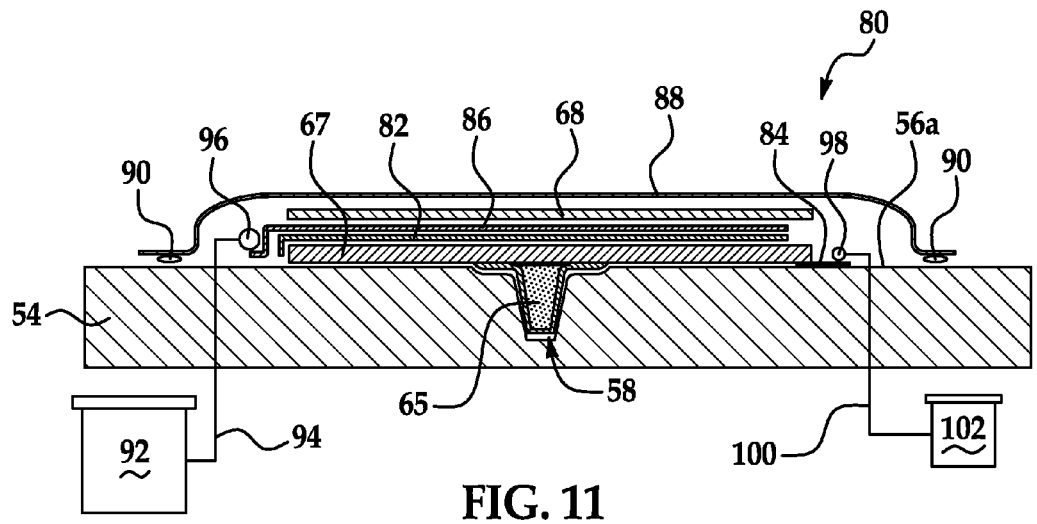
FIG. 11 is an illustration of a cross sectional view of apparatus, slightly exploded for clarity, to make a unitized, composite structure having integrally formed stiffeners.

Attention is now directed to FIG. 11 which shows additional details of a VARIM layup assembly 80 that may be used to carry out the steps of the method previously discussed in connection with FIG. 10. The stiffener preforms 65 are placed in the grooves 58 in the tool 54, following which the composite member reinforcement 67 is placed on the tool face 56, overlying and in contact with the stiffener preform 65. A peel ply 82 is placed over the composite member fiber reinforcement 67 and a suitable resin distribution media 86 is placed over the peel ply 82 to aid in moving and evenly distributing flowing resin. A peel ply 84 may also be placed under the outer edges of the composite member fiber 67.

A rigid or semi-rigid caul sheet 68 is placed over the resin distribution media 86, following which a vacuum bag 88 is placed over the layup and is sealed to the tool 54 by means of a sealant tape 90 or by similar means. In other embodiments, a double vacuum bag technique may be used in which a second vacuum bag (not shown) is placed over the first vacuum bag 88 in order to protect the preform 65 from leaks in the first vacuum bag 88 during the resin infusion and curing processes. The use of the caul sheet 68 and resin distribution media 86 is illustrative of one typical arrangement for resin infusion, but may not be required when other resin infusion techniques are employed. A variety of other resin infusion techniques are possible. A supply reservoir of thermoset resin 92 is coupled by a resin inlet tube 94 to an inlet channel tube 96 within the vacuum bag 88. An outlet vacuum reservoir 102 is coupled by a resin outlet tube 100 to an outlet channel tube 98 inside the vacuum bag 88.

A vacuum within the bag 88 generated by the outlet vacuum reservoir 102 evacuates the bag 88 of air, creating a pressure less than atmospheric pressure within the bag 88 that draws resin from the supply reservoir 92 into the bag 88 through the inlet channel tube 96. Prior to resin infusion, the bag 88 may be used to compact and consolidate the preform 65 and fiber reinforcement 67. Resin flows from the inlet channel tube 96 and exits the bag 88 through the outlet channel tube 98 where it is collected in the vacuum reservoir 102. As the resin travels from the inlet channel 96 to the outlet channel 98, preform 65 and composite member fiber reinforcement 67 are co-infused with a single shot of the resin while atmospheric pressure forces the bag 88 down onto the caul sheet 68. As mentioned earlier, FIG. 11 illustrates merely one of a number of resin infusion techniques that may be used to make the stiffened composite structure 30.

The caul sheet 68 applies substantially even pressure over its area to the infused preform 65 and composite member fiber reinforcement 67, causing the preform 65 and composite member fiber reinforcement 67 to be compacted and forced against each other during the resin infusion process. Heat may be applied to the infused preform 65 and composite member fiber reinforcement 67 both during and after the resin infusion process in order to encourage the resin flow, and then cure the resin to produce a unitized composite structure 30 in which the stiffeners 34 are essentially integrated into the composite member 32. The co-infusion of the preform 65 and composite member fiber reinforcement 67 with resin results in a substantially continuous and homogeneous resin matrix which holds and integrates the structural member and stiffener portions 32, 34 of the structure 30.

Figure 12:
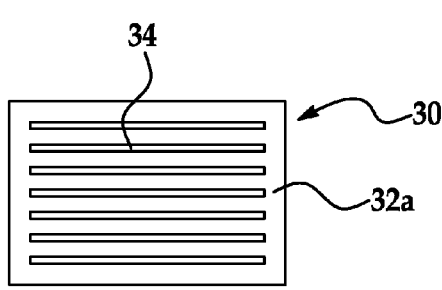
FIGS. 12-16 are illustrations of plan views of stiffened composite structures having differing configurations of stiffener layout.
Figure 13:
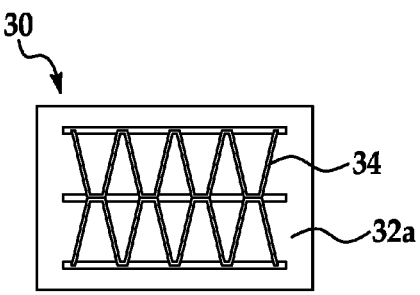
Figure 14:
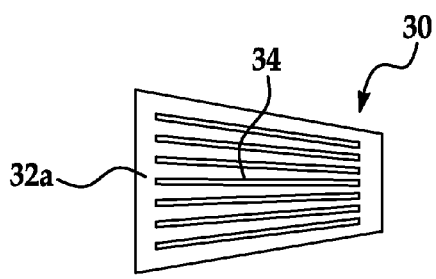
Figure 15:
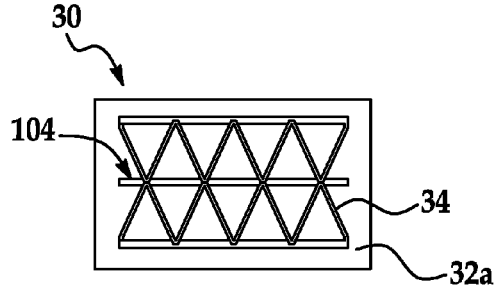
Figure 16:
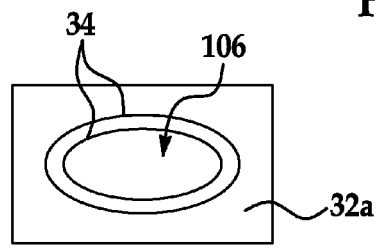

FIGS. 12-16 illustrate stiffened composite structures 30 having various layout patterns of the stiffeners 34. FIG. 12 illustrates a composite panel 32a stiffened with a plurality of integrally formed, generally parallel stiffeners 34, similar to the embodiments shown in FIG. 1. FIG. 13 illustrates a stiffened composite panel 32a in which the stiffeners 34 are arranged in a crossing-like grid pattern. FIG. 14 shows another variation in which the stiffeners 34 are arranged side-by-side but collectively taper along the length of the panel 32a. FIG. 15 illustrates an embodiment in which the stiffeners 34 are arranged in an iso-grid pattern, wherein the ends of the stiffeners 34 are interconnected at connecting nodes 104. FIG. 16 shows the use of generally concentric, oval stiffeners 34 surrounding an opening 106 in a panel 32a in order to reinforce the area of the panel 32a around the opening 106.

Figure 17:
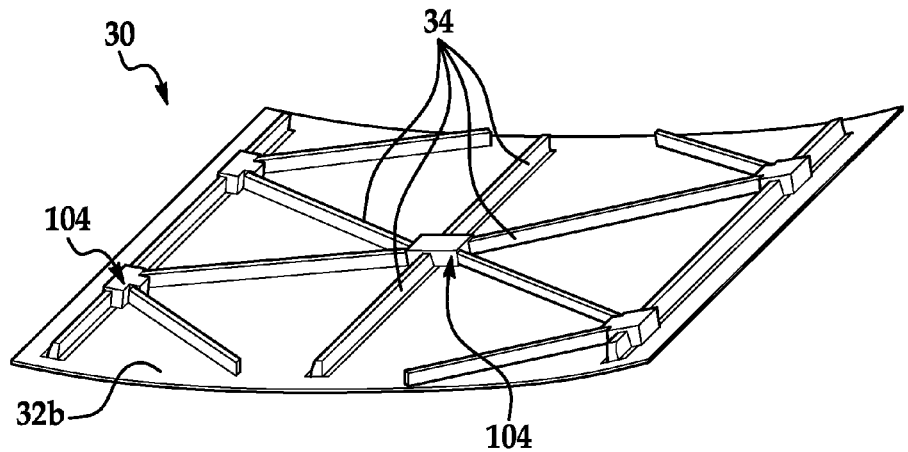
FIG. 17 is an illustration of a perspective view of a unitized aircraft skin having an integrally formed network of stiffeners.

FIG. 17 illustrates another example of a nodal grid stiffened panel 32b in which the stiffeners 34 are interconnected by connecting nodes 104 which may be recessed into the tool face 56a (FIGS. 10 and 11) during forming so that the connecting nodes 104 and the stiffeners 34 are integrally formed with each other and with the panel 32a during the fabrication process. In this example, the panel 32 is curved in a single direction, and thus, at least a certain number of the stiffeners 34 are also curved in the direction of the panel curvature. The connecting nodes 104 may comprise, for example and without limitation, a preformed rigid member, such as a metal member, a pre-cured composite member, or a dry or substantially dry fiber preform that is co-infused with resin with the composite member fiber reinforcement 67. In those embodiments where the connecting node 104 is a preformed rigid member, it may be co-bonded with the stiffener 34 and panel 32a, or it may be secondarily bonded with the stiffener 34 and the panel 32a using a layer (not shown) of adhesive placed between the connecting node 104, the stiffener 34 and the panel 32a.

Figure 18:
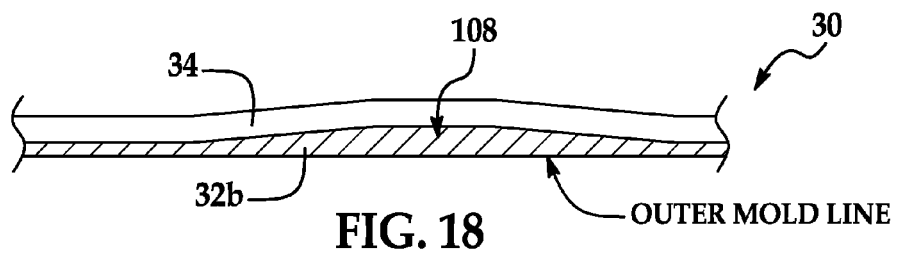
FIG. 18 is an illustration of a sectional view of a composite structure having an integral stiffener conforming to a thickness variation in the structure.

FIG. 18 illustrates a panel 32 having a variation 108 in thickness. This variation in thickness 108 may be accommodated by forming an appropriate depth contour in the tool face 56. The flexibility of the stiffener preform 65 allows the preform 65 to conform to the thickness contour 108 of the underlying panel 32b.

Figure 19:
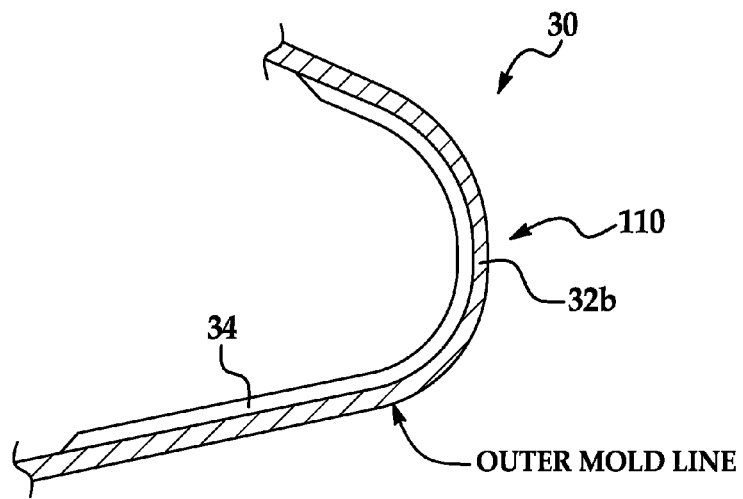
FIG. 19 is an illustration of a sectional view of a curved leading edge of an aircraft skin having an integrally formed stiffener.

FIG. 19 illustrates another unitized, stiffened composite structure 30 in the form of a leading edge 110 of an aircraft wing. This example illustrates the ability of the stiffeners 34 to conform to relatively severe curvatures, including compound curvatures. of the composite members 32 that they are intended to stiffen.

Figure 20:
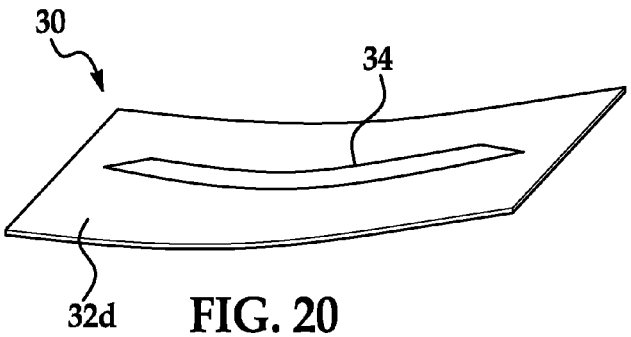
FIG. 20 is an illustration of a perspective view of a curved panel having an integrally formed stiffener.

FIG. 20 illustrates the use of a stiffener 34 to reinforce a panel 32 curved in one direction. The curvature of the stiffener 34 matches that of the panel 32.

Figure 21:
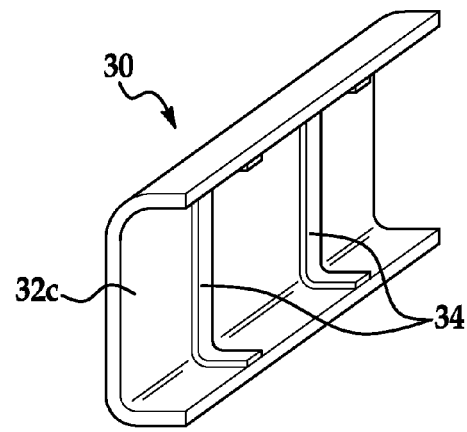
FIG. 21 is an illustration of a perspective view of a C-shaped structural member having integrally formed stiffeners.

FIG. 21 illustrates a unitized, stiffened composite structure 30 in the form of a C-shaped channel beam 32c that is reinforced by integrally formed rib-like stiffeners 34 matching the cross section of the beam 32c and which are spaced along the length of the beam 32c The rib-like stiffeners 34 may be employed in composite structures 30 having other cross sectional shapes.

Figure 22:
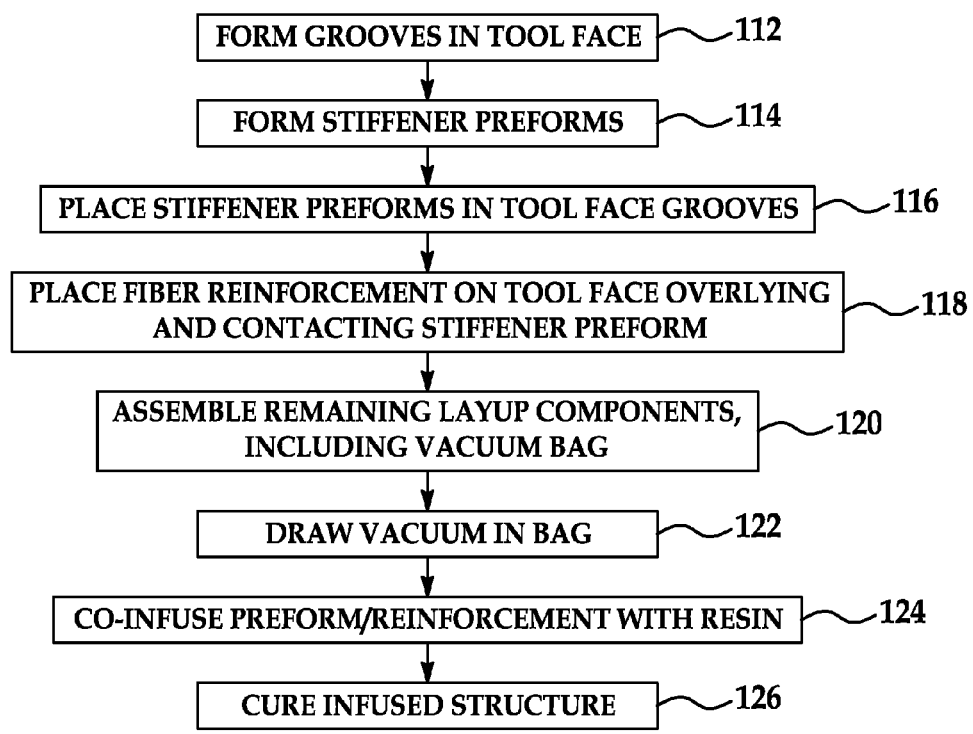
FIG. 22 is an illustration of a flow diagram of the overall steps of a method of making composite structures with integral stiffeners.

Attention is now directed to FIG. 22 which broadly illustrates the steps of a method of making a unitized composite structure 30 having the disclosed integrally formed stiffeners 34. Beginning at step 112, grooves 58 having the appropriate depth and geometry are formed in the tool face 56a by any suitable fabrication technique, such as milling the grooves 58 in a hard material such as steel. At 114, the stiffener preforms 65 are formed which may include laying up multiple plies of dry fiber material, which as previously noted, may comprise a braided, woven or knitted material. The stiffener preforms 65 may or may not be filled with a filler of the types previously discussed.

At 116, the stiffener preforms 65 are placed in the grooves 58 in the tool face 56a, following which at 118 the composite member fiber reinforcement 67 is placed on the tool face 56a, overlying and contacting the stiffener preforms 65, as previously described in connection with FIG. 11. At 120, the remaining components of the layup 80 are assembled, including placing the vacuum bag 88 over the preform 65 and composite member fiber reinforcement 67 and sealing it to the tool 54. Next, at 122, a vacuum is drawn in the bag 88, following which at 124, the preform 65 and composite member fiber reinforcement 67 are infused substantially simultaneously (i.e. co-infused) with a thermoset resin in a one-shot resin infusion process. The vacuum within the bag 88 may aid in drawing the resin into and through the preform 65 and the composite member fiber reinforcement 67. Although not shown in FIG. 22, a vacuum can be drawn in the bag 88 prior to the resin infusion step 124 in order to compact and consolidate the stiffener preform 65 and the fiber reinforcement 67 in order to reduce their volume so that a composite structure is produced having the lowest volume of resin. Alternatively, the compaction and consolidation process may be achieved during the resin infusion step 124. Finally, at step 126, the resin infused structure is cured by heating the structure according to a desired cure schedule.

Figure 23:
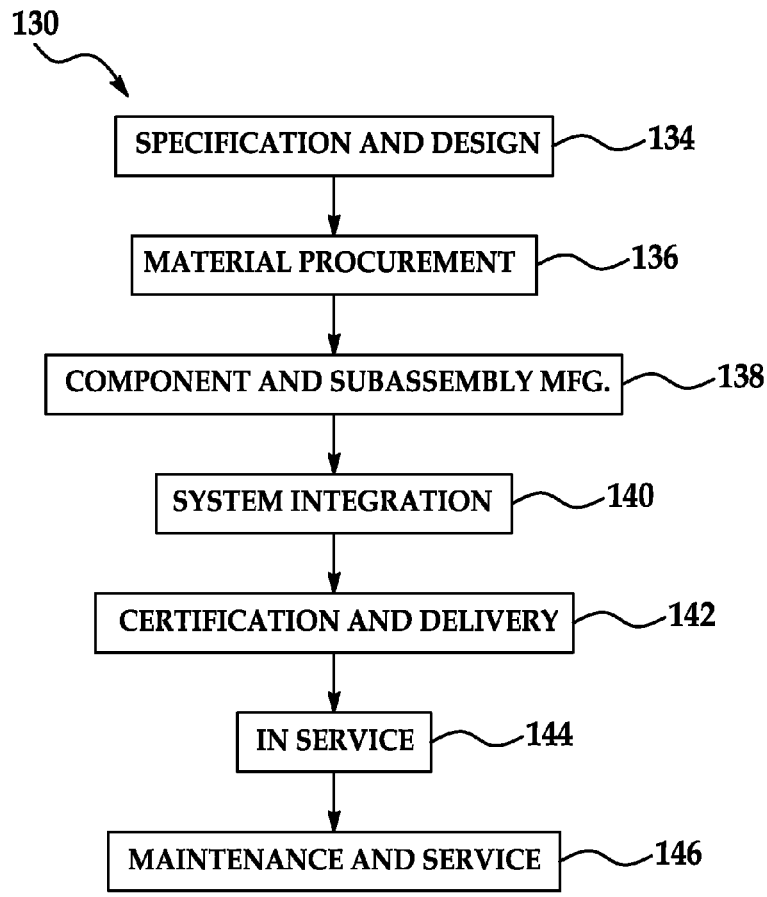
FIG. 23 is an illustration of a flow diagram of aircraft production and service methodology.
Figure 24:
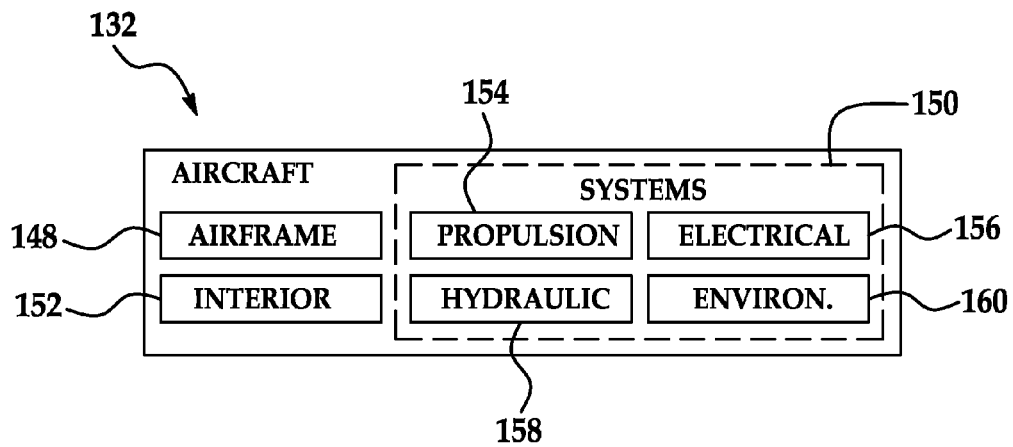
FIG. 24 is an illustration of a block diagram of an aircraft.

Embodiments of the disclosure may find use in a variety of potential applications, particularly in the transportation industry, including for example, aerospace, marine and automotive applications. Thus, referring now to FIGS. 23 and 24, embodiments of the disclosure may be used in the context of an aircraft manufacturing and service method 130 as shown in FIG. 23 and an aircraft 132 as shown in FIG. 24. Aircraft applications of the disclosed embodiments may include a wide variety of structural composite parts and components, including for example and without limitation, control surface skins, wing and empennage skins, stiffened access doors and panels, and stiffened ribs and spar webs, to name only a few. During pre-production, exemplary method 130 may include specification and design 134 of the aircraft 132 and material procurement 136. During production, component and subassembly manufacturing 138 and system integration 140 of the aircraft 132 takes place. Thereafter, the aircraft 132 may go through certification and delivery 142 in order to be placed in service 144. While in service by a customer, the aircraft 132 is scheduled for routine maintenance and service 146 (which may also include modification, reconfiguration, refurbishment, and so on).

Each of the processes of method 130 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 24, the aircraft 132 produced by exemplary method 130 may include an airframe 148 with a plurality of systems 150 and an interior 152. Examples of high-level systems 150 include one or more of a propulsion system 154, an electrical system 156, a hydraulic system 158, and an environmental system 160. Any number of other systems may be included. The disclosed method may be employed to fabricate stiffened parts, structures and components used in the interior 152 and in the airframe 148. Although an aerospace example is shown, the principles of the disclosure may be applied to other industries, such as the marine and automotive industries.

Systems and methods embodied herein may be employed during any one or more of the stages of the production and service method 130. For example, parts, structures and components corresponding to production process 138 may be fabricated or manufactured in a manner similar to parts, structures and components produced while the aircraft 132 is in service. Also the disclosed method embodiments may be utilized during the production stages 138 and 140, for example, by substantially expediting assembly of or reducing the cost of an aircraft 132. Similarly, one or more of apparatus embodiments, method embodiments, or a combination thereof may be utilized while the aircraft 132 is in service, for example and without limitation, to maintenance and service 146.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of making a unitized, stiffened composite structure, comprising:
   forming at least one recess in a face of a mold tool generally matching a size and location of a stiffener;
   placing a fiber preform in the at least one recess;
   placing a structural member fiber reinforcement on the face of the mold tool overlying the preform;
   co-infusing the fiber reinforcement and the preform on the mold tool with a thermoset resin creating a resin-infused fiber reinforcement and a resin-infused preform; and
   curing the resin-infused fiber reinforcement and the resin-infused preform to form the unitized stiffened composite structure, the unitized stiffened composite structure comprising the fiber reinforcement and the preform.

2. The method of claim 1, further comprising making the fiber preform prior to placing the fiber preform in the at least one recess, including forming a tubular shell around a core by laying up one or more plies of interconnected fibers.

3. The method of claim 1, wherein co-infusing the fiber reinforcement and the preform includes:
   placing a vacuum bag over the fiber reinforcement and the preform and the mold tool,
   generating a vacuum within the bag, and
   using the vacuum in the bag to draw the resin from a resin source into the bag and into the fiber reinforcement and the preform.

4. The method of claim 1, wherein placing the preform in the at least one recess is performed automatically by an automatic placement machine.

5. A method of making a stiffened composite panel, comprising:
   recessing a plurality of fiber reinforcement stiffener preforms in a face of a mold tool creating a plurality of recessed stiffener preforms;
   placing a fiber panel reinforcement on the face of the mold tool overlying and in contact with the plurality of recessed stiffener preforms;
   vacuum bagging the panel reinforcement and the plurality of recessed stiffener preforms on the tool;
   drawing a vacuum in the bag;
   co-infusing the panel reinforcement and the plurality of recessed stiffener preforms with a thermoset resin creating a resin infused panel reinforcement and a resin infused plurality of recessed stiffener preforms; and
   curing the resin infused panel reinforcement and the resin infused plurality of recessed stiffener preforms to form the stiffened composite panel, the stiffened composite panel comprising the panel reinforcement and the stiffener preforms.

6. The method of claim 5, further comprising:
   placing an adhesive between each of the plurality of recessed stiffener preforms and the panel reinforcement.

7. The method of claim 5, further comprising:
   placing a second reinforcement inside each of the plurality of recessed stiffener preforms.

8. The method of claim 5, further comprising:
   using atmospheric pressure and the bag to compact the plurality of recessed stiffener preforms against the panel reinforcement during the co-infusion.

9. The method of claim 5, further comprising:
   recessing connecting nodes in the face of the mold tool connecting the plurality of recessed stiffener preforms.

10. The method of claim 5, wherein recessing the plurality of fiber reinforcement stiffener preforms in the face of the mold tool includes forming grooves in the face.

11. A method of making a unitized composite aircraft skin having integrated stiffeners, comprising:
    fabricating a mold tool, including forming a plurality of grooves in a face of the tool;
    making fiber reinforcement stiffener preforms in a shape of tubes, including forming a shell by wrapping plies of interconnecting reinforcing fibers around a core;
    using an automated placement machine to automatically place the stiffener preforms in the plurality of grooves;
    making fiber reinforcement node preforms;
    placing the node preforms in the plurality of grooves at locations that interconnect the stiffener preforms;
    making a fiber skin reinforcement;
    placing the skin reinforcement on the face of the tool overlying and contacting the stiffener preforms;
    placing a caul sheet over the skin reinforcement;
    placing a vacuum bag over the skin reinforcement and stiffener preforms;
    forming a vacuum tight enclosure over the skin reinforcement and stiffener preforms by sealing the bag to the tool;
    connecting the enclosure with a source of thermoset resin;
    producing a vacuum within the enclosure by evacuating air from the bag;
    infusing the skin reinforcement, the stiffener preforms and the node preforms with the resin substantially at the same time by using the vacuum within the enclosure to draw resin from the source into the enclosure;
    using the bag and atmospheric pressure to compact the resin infused skin reinforcement, the stiffener preforms and the node preforms; and
    curing the resin infused skin reinforcement, the stiffener preforms and the node preforms to form unitized composite aircraft skin, the unitized composite skin comprising the skin reinforcement, stiffener preforms, and node preforms.

* * * * *